United States Patent
Laussermair et al.

[19]

[11] Patent Number: 6,137,967
[45] Date of Patent: Oct. 24, 2000

[54] DOCUMENT VERIFICATION AND TRACKING SYSTEM FOR PRINTED MATERIAL

[75] Inventors: Thomas Laussermair; Abhijit Bhattacharya, both of Delray Beach; Michael Schmitt; Tony Ribeiro, both of Boca Raton, all of Fla.

[73] Assignee: Oce Printing Systems GmbH, Poing, Germany

[21] Appl. No.: 09/394,546

[22] Filed: Sep. 13, 1999

[51] Int. Cl.$^7$ .................................................. G03G 15/00
[52] U.S. Cl. ........................... 399/16; 358/462; 382/112; 399/15; 399/384
[58] Field of Search ................. 399/1, 2, 3, 15, 399/16, 49, 38, 361, 384; 382/112, 181, 183; 358/462, 474, 498; 347/107

[56] References Cited

U.S. PATENT DOCUMENTS

| | | | |
|---|---|---|---|
| 4,027,142 | 5/1977 | Paup et al. | 347/107 X |
| 4,563,086 | 1/1986 | Knapp et al. | 399/49 |
| 4,980,719 | 12/1990 | Allen et al. | 399/3 |
| 5,025,483 | 6/1991 | Dinan et al. | 382/318 |
| 5,132,808 | 7/1992 | Higuchi et al. | 358/403 |
| 5,235,652 | 8/1993 | Nally | 382/112 |
| 5,299,026 | 3/1994 | Vincett et al. | 358/401 |
| 5,337,122 | 8/1994 | Hubble, III et al. | 399/49 |
| 5,506,663 | 4/1996 | Ulrich et al. | 399/361 X |
| 5,576,811 | 11/1996 | Koayashi et al. | 399/60 |
| 5,635,698 | 6/1997 | Terada | 235/462 |
| 5,778,297 | 7/1998 | Reichi et al. | 399/384 |

FOREIGN PATENT DOCUMENTS

WO 99/24877  5/1999  WIPO.

*Primary Examiner*—Sophia S. Chen
*Attorney, Agent, or Firm*—Hill & Simpson

[57] ABSTRACT

In a multifunctional printing method and printing system, printed material is checked, verified and tracked. For that purpose different test equipments are located in-line with a printing line. Magnetic information being printed by a printing station onto the recording carrier using magnetic ink character readable toner may be in-line tested by a magnetic test equipment, which reads information from the magnetic recording zone on the carrier. Optical information may be tested by an in-line mounted optical test equipment, respectively. Further in-line test equipment is proposed such as a laser bar code scanner and an address reader. The printing line may comprise additional devices such as print preprocessing unwinders or print postprocessing stackers, folders or cutters.

32 Claims, 6 Drawing Sheets

DOCUMENT VERIFICATION AND TRACKING SYSTEM FOR PRINTED MATERIAL

RELATED APPLICATION

An electrophotographic printing system adapted to use various developer stations for different kinds of toner has been described by the Applicants of the present application already in WO-A-99/24877 (U.S. Ser. No. 09/254,292).

BACKGROUND OF THE INVENTION

This invention relates to printing systems. In particular, the invention relates to a printing system which is adapted to produce printed documents with high speed, whereby the printing data are provided from a variable print data source and the printing system is a kind of production line.

In today's high speed printing environment the assurance of document verification and process control is increasing. However, according to a further demand, the printing speed should not be significantly reduced by any inspection techniques. The speed of a single high-speed printer normally exceeds 50 DIN A 4 pages per minute. Its speed may even be some hundreds up to a thousand DIN A 4 pages (images) per minute and—by further development of high speed variable data printers—may even increase to still higher printing speeds.

To further increase the printing speed of variable data printing lines, it has been proposed to perform printing of documents over two or more printers. In particular, this may apply to printers printing on fanfold recording carriers, whereby the carrier already printed by a first printer is subsequently fed to a second printer for a second printing process. The first printer may print onto a first side (front side) of the printing carrier while the second printer may print onto the reverse side of the carrier. Alternatively, the first and second printers may print on the same side of the carrier, but the printers may be loaded with different inks. In particular, electrographic printers such as electrostatographic or magnetographic printers may utilize different toners such as standard optical black toner, colored toner or magnetic ink character readable toner, which is also known in the art as MICR toner.

A further electrophotographic printer especially adapted for printing on a fanfold recording carrier is described in U.S. Pat. No. 5,778,297.

In many presently available printing systems document verification is not performed at all. However, there have been proposed printing systems with integrated qualification or inspection systems for the printed images. Such a system is described in U.S. Pat. No. 5,235,652. This system comprises a set of measurement modules which have sensors for forming various inspection functions such as image location and spacing measurements; image print contrast/intensity measurement; image skew angle measurements; image stroke width measurement; image edge variation measurement; image void measurement; image size and dimension measurement; image extraneous ink measurement and image curvature measurement.

If such a document verification system is to be introduced into a production printing line, various technical problems occur.

SUMMARY OF THE INVENTION

An object of the invention is to provide a system for inspecting printed documents comprising optical and magnetic information. More particularly, the information may be printed on a continuous web-shaped recording carrier. Still more particularly, the carrier may be fanfold paper.

According to a first aspect of the invention there is provided a method or a system for printing at least one of optical and magnetic information onto a continuous web-shaped recording carrier. The carrier comprises at least one of an optical recording zone and a magnetic recording zone. Magnetic information is printed by a printing station on the recording carrier using magnetic ink character readable toner (MICR toner). Optical information printed by the printing station is being tested by an optical inspection system and magnetic readable information printed by the printing station is being tested by a magnetic inspection system. Both the optical inspection system and the magnetic inspection system are located in-line to the printing line. In addition to at least one printing device, the printing line may comprise additional devices such as printer preprocessing unwinders or print postprocessing stackers, folders or cutters.

When a continuous web of recording material is used, such as paper unwound from a roll or fanfold paper input from a stack, the in-line inspection systems are located at any place of the printing line along the web, where the inspection system may be able to inspect information, which is printed on the web.

In a preferred embodiment of invention, the testing step is controlled by print stops of the printing station. In a still more preferred embodiment of the invention, the magnetic test equipment is mounted at an output zone of a printing device and in particular it is mounted at a stacker. Testing may comprise print quality, e.g. optical density or strength of magnetic field, as well as a print contents test.

According to another aspect of the invention, a system controller is provided, by which printing operation is selectively stopped for verification of recorded magnetic information on the carrier.

According to a still another object of the invention, three different scanning systems, in particular an optical camera system, a bar code scanning system and a reading device for magnetic ink are operating in combination. Signals of these three different scanning systems are captured by a data acquisition system and the data are processed by a data management system. According to this aspect of the invention, print quality inspection, document verification and document tracking may be performed. Print quality inspection may comprise, but is not limited to, optical density measurement, magnetic character signal level and signal uniformity across the document. Document verification may comprise but is not limited to comparison between predetermined data to be printed and data captured by the inspection system from the printed document. For that purpose an electronic comparison device may be connected to both an electronic print data source and the document test equipment.

According to the latter aspect of the invention, three different technologies are used to check or verify printed documents in a document production line. The first technology might comprise a vision system such as a CCD camera for checking optical information on the documents. The second technology may comprise a laser scanner for checking bar code information on the documents. The third technology may comprise a magnetic ink reading device to check magnetically coded information printed on the documents. Any information read from the documents is processed through an intelligent data acquisition system. An overall management system will use such data to allow high level client applications to display information, to support decision making based on them and to track documents passing through the printing system.

In particular, the invention is suitable for use in document printing lines which print magnetic information onto the documents. The printing line may comprise a printing device as disclosed in WO-A-99/24877, corresponding to U.S. Ser. No. 09/254,292. The printing device described therein is an electrophotographic printing device which prints magnetic ink character recognition toner (MICR toner) on documents. This U.S. patent application is hereby incorporated by reference into the present disclosure.

According to a still further object of the invention, document tracking is performed. Document tracking implies the precise monitoring of the position of a particular document throughout the production line at any given time. Various checkpoints are arranged along a printing line for printing documents. At each checkpoint any document passing the checkpoint will be detected and its position and actual time are stored in a document tracking managing system. Thereby, the actual document position may be monitored at any given time.

DESCRIPTION OF THE PREFERRED EMBODIMENTS

Figure 1:
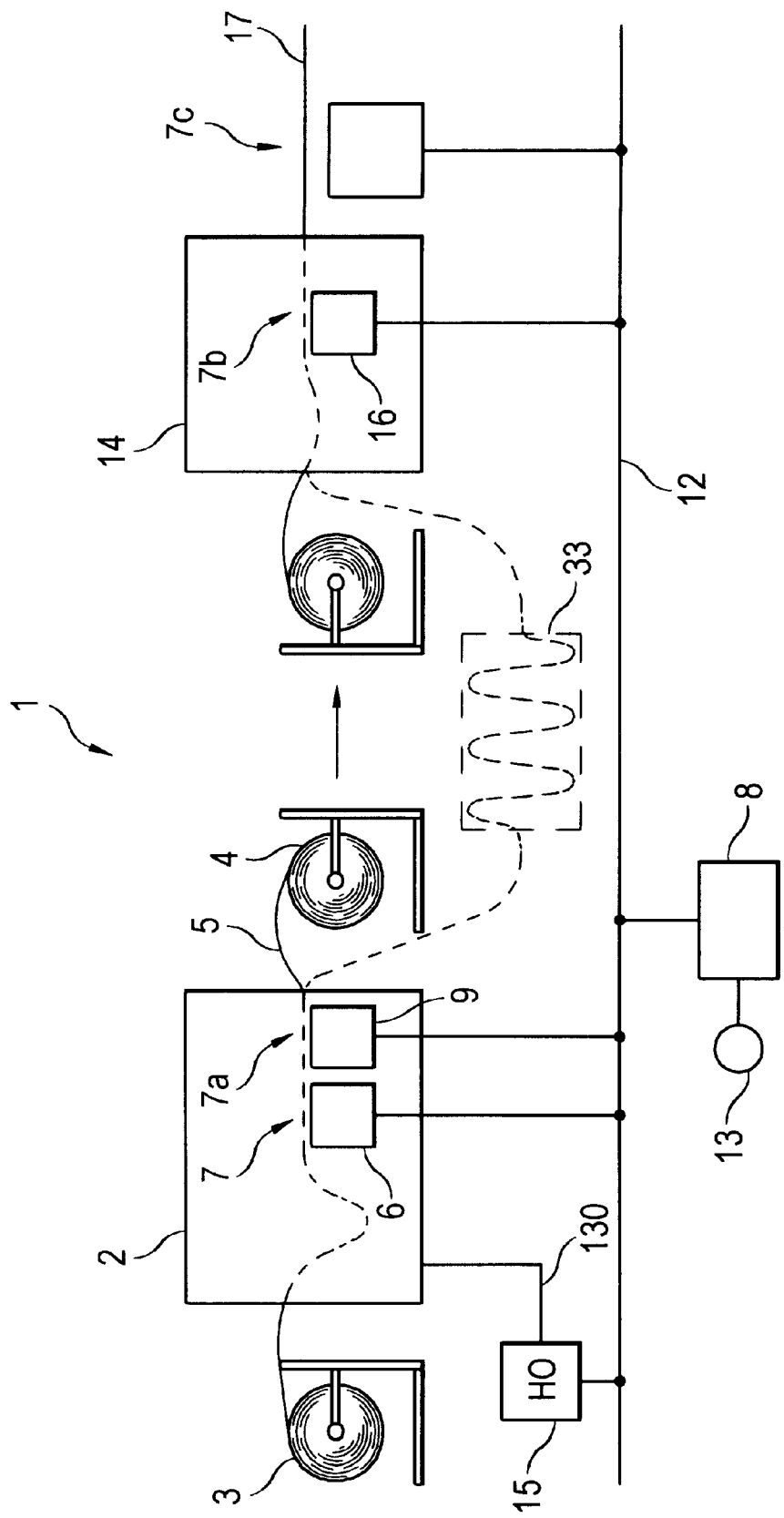
FIG. 1 illustrates a printing line.

In FIG. 1, a printing line 1 is shown comprising an electrophotographic printer 2, which receives paper from an unwinding roll 3 and delivers documents printed on fanfold paper web 5 to a winding roll 4. The printer 2 receives a print data stream from a data source 15 (host computer) via a direct data line 130 or via a state-of-the-art computer network (LAN,WAN) 12. Documents printed in the printer 2 are provided with a bar code. The bar code is read by a laser-based bar code scanner 6, which is located within the printer 2 or between printer 2 and winding roll 4. Documents having passed the first checkpoint 7 are forwarded to a second checkpoint 7a, where optical information, that is, images or characters, printed on the paper web, are being checked by a CCD camera 9. Bar code scanner 6 and CCD camera 9 may exchange data with a workflow management computer 8 by a data line 12. Computer 8 and all equipment connected to the data line 12 are part of a local area network (LAN). This network may even be connected to a second, wide area network (WAN) such as world wide web (WWW). The networks may support state-of-the-art network protocols such as TCP/IP.

Workflow management computer 8 is connected to a data base 13, where specific production relevant data of the printing process are stored for further data processing. Relevant data such as location of specific documents, job numbers and statistical data may be stored in data base 13. Once the winding roll 4 is full, the roll will be docked to a post-processing device 14. Within this device, the documents are checked at a third checkpoint 7b by an address reader 16. Thereby, computer 8 receives information as to which document is currently being processed in the post-processing device 14. Within device 14 the printed fanfold paper web 5 is cut into individual single sheets and the printed document 17 is being folded and inserted into envelopes. The completed envelopes are forwarded to a fourth checkpoint 7c, where the addresses printed on the envelope are being checked. At checkpoint 7c addressed data are again forwarded to management computer 8 for control of the document production process, i.e. for the workflow process. All of the checkpoints 7, 7a, 7b and 7c and the test equipment located at these checkpoints are arranged along the transport path of the paper web 5, i.e. they are located in-line with the printing line 1. In a slightly different embodiment, winding roll 4 is not used. Instead, the printing web may directly be fed from printer's 2 output to print postprocessing device 14 or through a paper buffer 33, which may buffer some thousand pages of documents.

Figure 2:
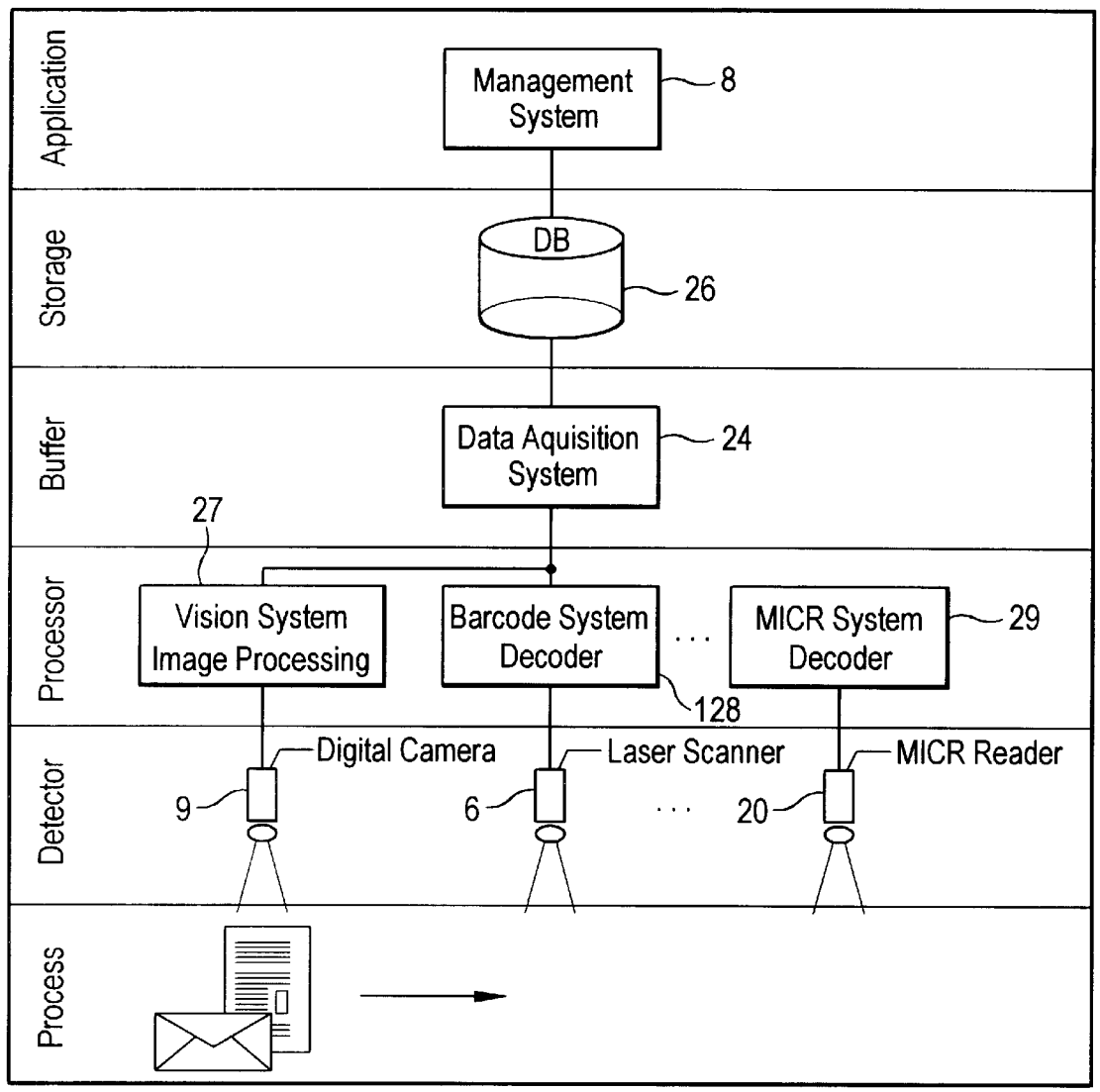
FIG. 2 illustrates a schematic illustration of electronic components for document verification and tracking.

FIG. 2 shows a workflow process and respective system components, which may be utilized for inspecting optical information printed on the documents, tracking the documents by printed bar code information and checking any magnetic information by a MICR system.

All three different inspection systems, i.e. CCD camera 9, laser scanning bar code reader 6 and MICR reader 20 have respective electronic equipment, which receives the signal from the scanner and processes these signals for further prosecution to a data acquisition system 24. That is, vision system 27 performs image processing of the data received from the digital camera 9, bar code system decoder 128 processes signals received from bar code laser scanner 6 and MICR system decoder 29 processes any data received from MICR reader 20. The data acquisition system 24 is a multi-threaded software program capable of reading and passing data sent by various scanning systems (camera, bar code, MICR) and storing the data into either a flat file or a data base in a form suitable for further processing. Dataline 25 may be part of local area network 12 or may be a separate serial line, e.g. RS232 or any other commonly used data line. The data processed in the data acquisition system 24 may be stored in a memory 26 and further processed by the management system, which may be the workflow management computer 8.

Figure 3:
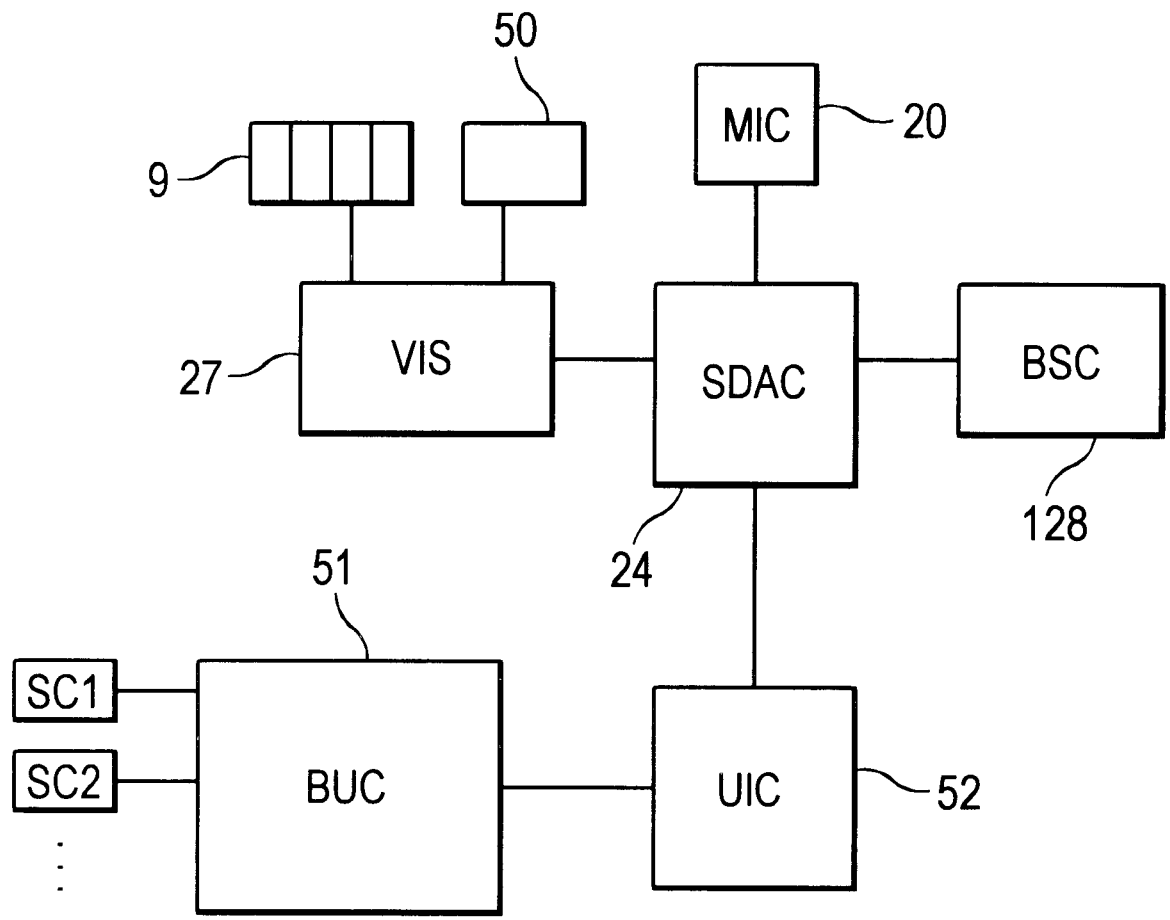
FIG. 3 system control components.

FIG. 3 shows control components of the document production and document tracking system in more detail. Bar code scanner 6 is a high speed laser bar code scanner which is able to scan in one-dimensional fashion as well as a two-dimensional bar code. Within the total printing line, different bar code scanners can be mounted at different locations. A first bar code scanner is mounted in-line with the printer 1 and a second bar code scanner is located at any location of the production line following the electrophotographic printer.

Figure 4:
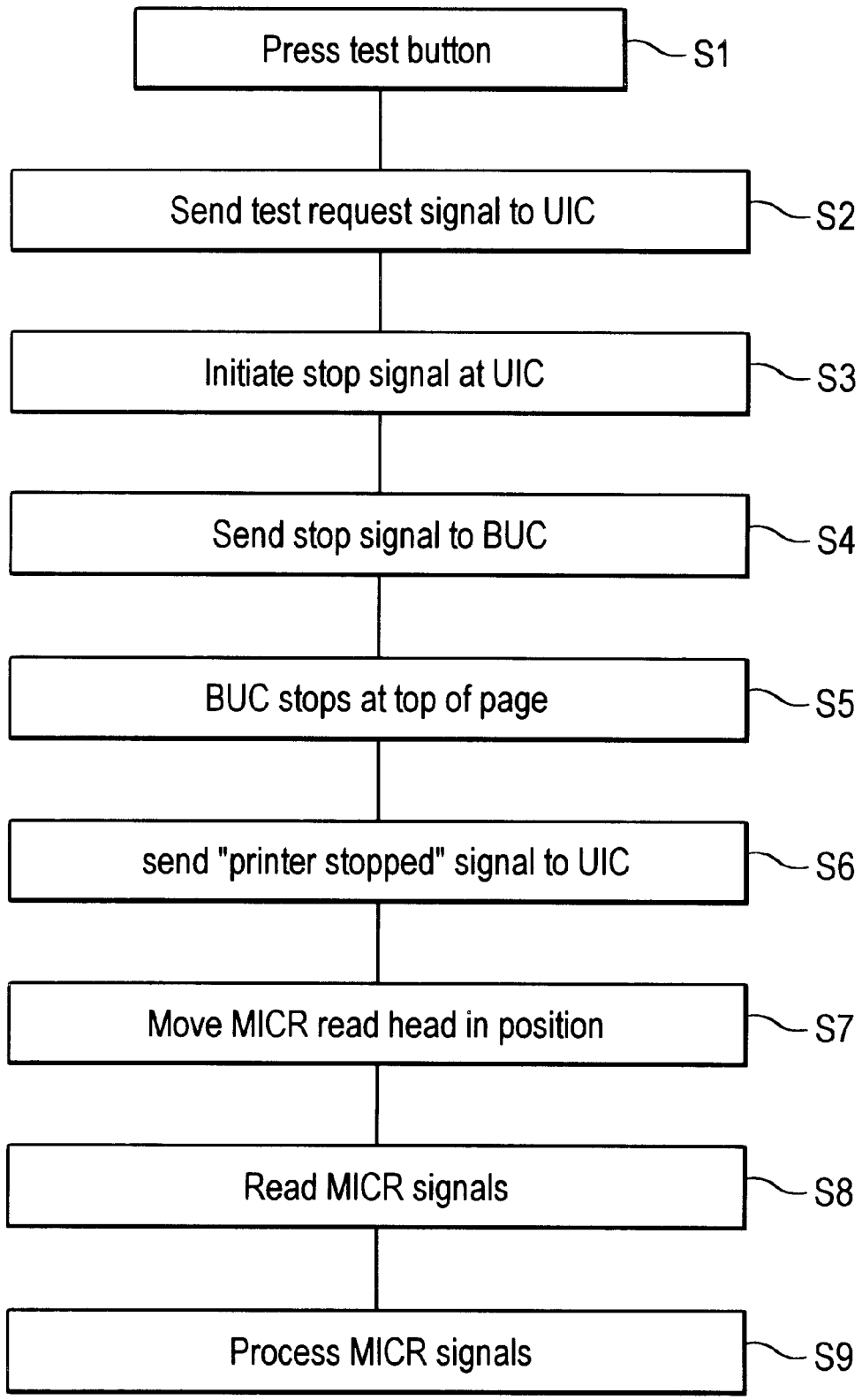
FIG. 4 is a flow chart illustrating process steps for MICR testing.

FIG. 4 shows a modular structure of the test equipment and its connection to respective controllers.

Visioning System

The vision system is based on four charge-coupled device (CCD) cameras 9 which inspect the whole width of the paper web 5 up to 18 inches, the paper web 5 being transported through the electrophotographic printer 2. The vision system controller 27 is also connected to a xenon strobe light. The vision system controller 27 synchronizes image capture of vision cameras 9 with high intensity light, which is strobed by the xenon strobe light. Each time the xenon light 50 is strobed, a digital image is taken. The actual strobing pulses are further synchronized with printer clock pulses provided by a basic control unit of the electrophotographic printer. Thereby, the precise location of the image is secured.

Once a digital image of the printed paper has been acquired, image processing can be performed by a software running on the vision system controller 27. Image processing steps may include but are not limited to:

- optical carrier recognition (OCR) to verify characters or texts. For that purpose, recognized characters on the printed physical output may be compared with predetermined data. Such predetermined data may in particular comprise data of the electronic data stream which has been provided from host 15 to the printer 2 for printing.
- carrier analysis to detect carrier defects such as holes
- print quality measurement, e.g. grey level intensity check
- sequence number check for registration and tracking of documents. For that purpose, the vision system may read document identification data such as numbers printed on the documents on predetermined locations. The vision system compares these data with externally provided data (number sequences). The vision system may also detect any bar code printed on the documents and use such information for tracking.
- logo verification. For that purpose, an image within a region of interest (ROI) is compared with a predetermined pattern.

To perform these image processing steps, data for comparison may be provided by an external source. Respective data may also be provided from printer basic control unit 31. Alternatively, if one and the same information is repeatedly to be printed, respective data may be generated by a teach-in process, whereby the regularly printed information is stored in a memory within the vision system controller 27.

The results of these measurements are sent to the data acquisition system 24. In addition, the vision system controller 27 may be configured to stop the print line when certain definable criteria are met, e.g. if threshold values are exceeded or data trends are negative.

Bar Code Reading System

The bar code reading system may be utilized by a state-of-the-art laser scanner system which is capable of reading at least one-dimensional bar codes or even two-dimensional bar codes. Data obtained by the bar code reading system are passed to the data acquisition system 24, which processes the data and finally sends the processed data to management computer 8. The bar code may be mounted in-line with the printer 2 as shown in FIG. 1 or at any other arbitrary location of the printing line 1.

MICR Reading System

To inspect information written with magnetic ink character reading (MICR) toner, the MICR reading system will provide the capability of proof-reading the MICR line on a document. Since in many printing applications MICR information is printed in a direction transverse to the transport direction of fanfold recording carrier web, the web has to be stopped to perform a MICR reading process. During the reading process, the MICR reading system is moved transversely across the printing web. The recording web and thus the document to be checked stand still during the MICR reading process.

The MICR reading system is in-line with the printing line (printing system), i.e. reading can be performed directly on the recording web within its path through the printing line. Thus, it is not necessary to cut a sample out of the web for proof-reading any MICR information. Thus, the MICR reading process can be performed at any time when the printing web within the printer is stopped. Whenever the printer is stopped manually or automatically (e.g. for a clean stop or for a pre/post-stop), the paper will be advanced or reversed automatically to a defined position so that the MICR read head is aligned on the printed MICR line on the document. Afterwards, the proof-reading scan goes transversely across the paper or document. The MICR reading results will be provided by the MICR reading system controller 29 and may be displayed by a suitable display which is connected to the controller 29. Respective data are sent to the data acquisition system 24 and further processed by printer basic unit control 51 or user interface control 52.

Data acquisition system

The data acquisition system accepts data of the different test equipment (optical, bar code, MICR) and may send these data either to overall system computer 8 via a port and data line (RS 232) or via a network (LAN). Alternatively or in addition to sending it may store the information in a flat file or in a data base (e.g. SQL).

Management system

Management system computer 8 stores a SQL data base. Any status information of the printed documents which are received from the data acquisition system are stored and updated in the SQL data base. The data are processed within the computer 8 by software which tracks the location (whereabouts) of any document which is currently processed by the printing production line 1. Computer 8 may comprise a graphical display for displaying status messages, document locations etc. Additional functions such as reprinting documents or creating alerts can be performed by management system computer 8.

In FIG. 4, a process for acquiring MICR data in a printing line as described above is demonstrated. By a first step S1 a test button is pressed at an input device (keyboard, touch-screen) which is connected to user interface controller 52. A test request signal is sent to user interface controller 52 (step S2). User interface controller 52 then generates a stop signal (S3) and sends this signal by step S4 to basic unit controller 51. Upon receipt of the stop signal, the basic unit controller checks the current position of the recording carrier 5 within the printer 2 and stops the carrier at a predetermined position, e.g. at a position, in which top-of-next-page is at the location of MICR reader 20 (step S5). Therefore, steps S6 to S9 occur as shown in FIG. 4.

Figure 5:
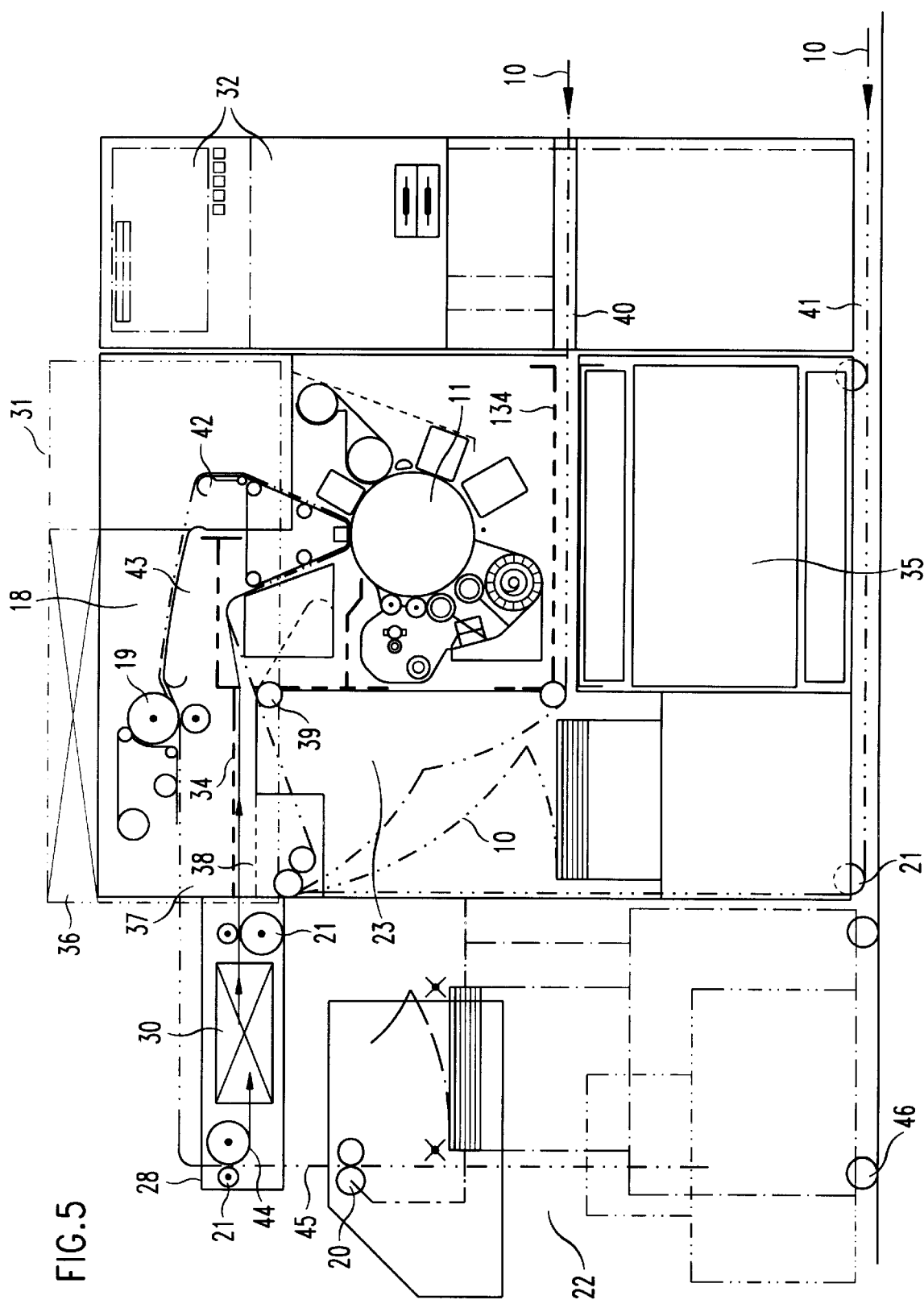
FIG. 5 illustrates components of an electrophotographic printer.

FIG. 5 shows a printing device according to a still further embodiment. Instead of unwinding and winding rolls, this printer utilizes fanfold paper stacks. A paper web is thereby put in from an input stack and put out to an output stack into a movable output stacker. Further details of this printer are disclosed in U.S. Pat. No. 5,778,297. The contents of this patent are hereby incorporated by reference to the present disclosure.

The multi-functional printer device is composed of a central printer module 31 with deflection means 28 adapted thereto and an accompanying, mobile stacker means 22, as well as of a control module 32 with operating surface. The printer module 31 is constructed as a distortion-stable torsion box. To this end, two lateral sheet steel billets extending to the floor are connected to one another via intervening traverse elements 34 in the form of extruded aluminum profiles to form a torsionally rigid supporting framework. This serves, among other things, for the acceptance of the core electrophotographic units 11, namely an intermediate carrier unit (photoconductive drum) generating the toner images, charging unit, character generator, developer station, transfer printing station, cleaning station, discharge unit and fixing station 18. The individual units are thereby suspended in the lateral billets, as a result whereof a high-precision allocation of the units to one another is achieved. The risk of paper running faults due to misalignment is thereby reduced during operation of the printer device. Repeated readjustment is thus eliminated. The allocation stability is further enhanced in that stable unit sub-modules are formed via the cross-bracings 134 allocated to the individual units. For example, in the form of a fixer module 18, a photoconductor module, a region for the supply stack 23 and a region for the acceptance of the device electronics 35.

For forming a service-friendly, compact printer structure, the individual units are arranged such within the printer module such that, on the one hand, the throughput path of the paper web 10 becomes optimally short and, on the other hand, the heat required for the fixing process does not negatively influence the units or, respectively, the paper web. For this purpose, the fixing station 18 is arranged in the uppermost region of the printer module above the unit (intermediate carrier 11) that generates the toner images. The heat arising during fixing, including the substances exhaled by the paper, are immediately extracted via a vapor extraction hood 36. The paper web traverses the fixing station 18 nearly horizontally and leaves the printer module via a paper output channel 37. A return channel 38 that likewise proceeds horizontally is located under the fixing station for returning the narrow recording medium that has been deflected and/or turned over via the deflection unit 28. In a feed region to the photoconductor module, the return channel 38 is in communication with a delivery channel 39 for recording media of different tape widths. The recording medium 10, is supplied to the photoconductor module via this delivery channel 39 proceeding from a supply region, for example the supply stack 23. Further, external delivery channels 40, 41 that 40 cut through the printer module or lead 41 around the printer module are also provided in order to be able to supply the recording medium to the photoconductor module proceeding from an external supply stack. The entire paper path through return channel 38, photoconductor module and fixing station 18 is designed such that an optimally short paper running distance derives and such that the recording medium is supplied approximately horizontally to the deflection unit 28 and passes therethrough roughly horizontally. The following cooling path thus becomes arbitrarily large and can be freely designed. A complicated production of cooling air is thus eliminated.

Conveyed by a conveyor unit, the paper web leaves the transfer printing station steeply upward, is deflected by 60–90° via a looper 42 and by up to 45° more via a saddle 43, and passes through the fixing drums 19,20 nearly horizontally. Since the minimum wrap angles of looper 42 and saddle 43 are functionally predetermined, it is beneficial for achieving such a horizontal feed attitude when the transfer printing station is arranged roughly in the middle above the photoconductive drum 11.

The deflection unit 28 is likewise fashioned as a module that can be coupled to the paper output channel 37 and the return channel 38 of the printer module via releasable fastening unit, for example screw-type or snap-in closures. It contains guide rollers 21 and, as a separate structural unit, a turn-over unit 30. This turn-over unit 30 can likewise be detachably secured on carriers of the deflection unit and, for example, can be pulled out via hinges. It is freely accessible, so that disturbances in paper running can be eliminated without parting the paper web.

The deflection unit 28 also contains a manually or motor controllable shunt 44 via which the recording medium 10, proceeding from the paper output channel, is supplied via the deflection unit to the return channel 38 in a first operating mode of the printer device for multiple printing of the narrow recording medium 10, and, after another pass through the unit that generates toner images, is supplied to the mobile stacker unit 22 via an output channel 45 allocated to the deflection unit. The mobile stacker unit 22 provided with rollers 46 and/or the sidewall of the printer module can comprise fit elements that enable a positionally exact seating of the stacker unit 22 against the printer module. The deflection unit 28 can likewise be part of the stacker unit 22. A MICR reader 20 is mounted on a plate at the stacker 22, which will be described in more detail later with reference to FIG. 6.

Figure 6:
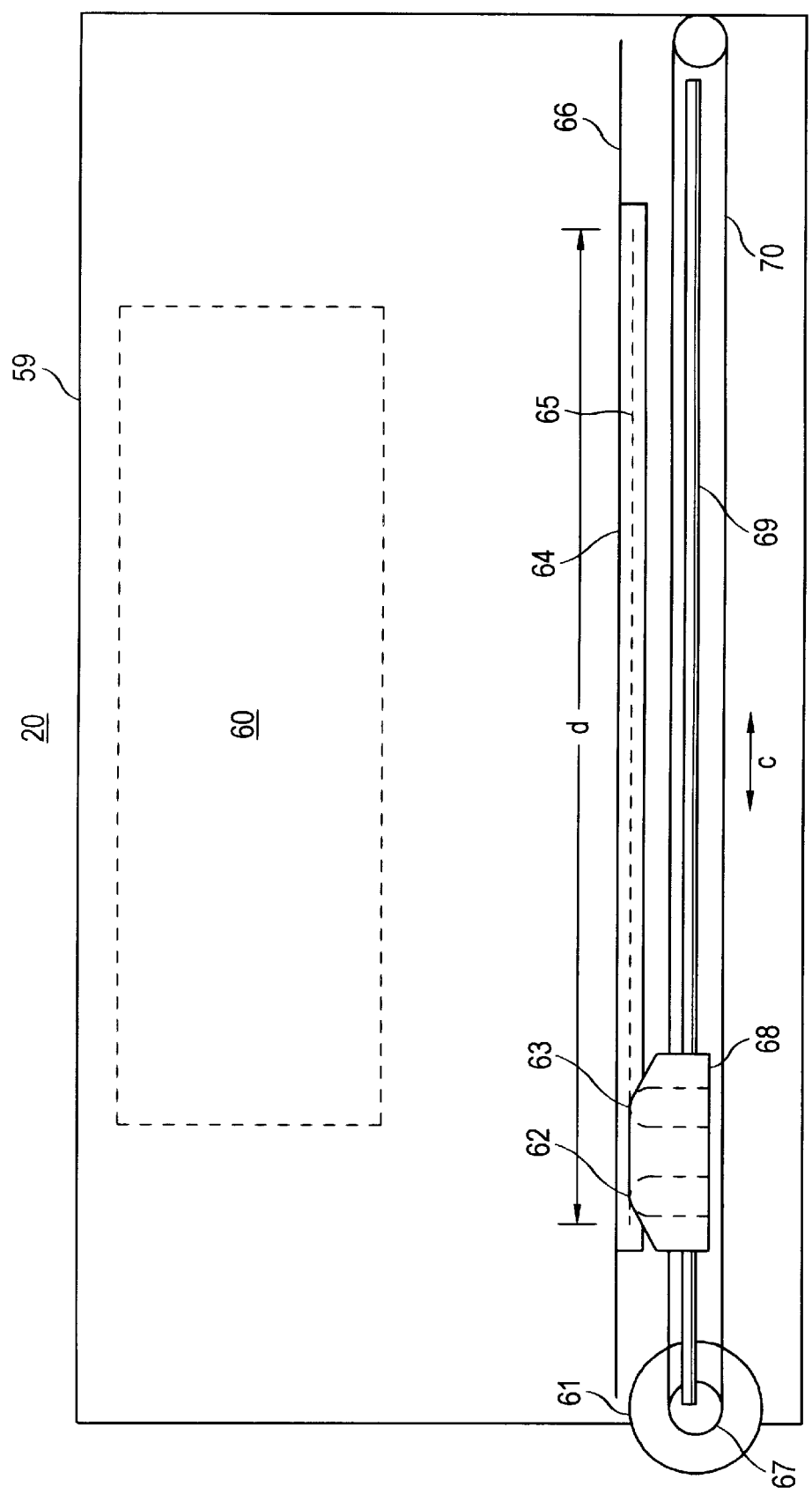
FIG. 6 illustrates an MICR testing device mounted at a stacker.

FIG. 6 shows the MICR reading device 20 as it is mounted on the stacker 22. The paper web 65 passes along the stacker through a paper slot 64. The reading device 20 is mounted to a stacker top plate 59 and comprises a drive mechanism 61, 67 as well as a carrier 68 carrying magnetic read/write heads 62, 63. The paper web 65 having width d (up to 18") is stopped and correctly positioned relative to the reading device 20 (see FIG. 4). The MICR head carrier 68 is then transported by motor 61, drive pulley 67 and drive cable 70 across the paper width along axis C. During that movement, the MICR read head 62 reads magnetic information provided on the paper web and produces analog reading signals. The movement of the MICR head carrier 68 is guided by carrier guide rail 69. To support the paper web 65 and the MICR head carrier 68 during the reading process, a paper backup plate 66 is provided. Thereby, the reading process is enhanced, since the paper web is kept in position during the reading step. The analog signals provided by MICR read head 62 are forwarded to MICR electronic device 60, which is mounted to stacker top plate 59. Device 60 forwards data in digitized format to data acquisition system 24. MICR write head 63 may be utilized to write or update MICR data on the documents at the stacker.

When the paper web stops at a top-of-page position, the MICR head carrier 68 cycles across the continuous form on demand, reading all magnetically coded characters of the respective documents. Within the electronic device 60 the ANSI conformance of the read characters is proved and reported to serial data acquisition system 24. Given ANSI (American national standards institute) compliance of the MICR print, the software in the management system computer 8 will generate a predominately green signal-strength bar graph display, recommending to the operator an immediate resumption of printing. A non-compliance test result will generate a yellow or red bar graph display and allow further screens to be accessed to identify the nature of the MICR print problem. In either case, results can be automatically stored, reports printed, and ASCII MICR line data saved for production control purposes.

According to the invention, the printing device may use a changeable developer station, whereby a quick change between a first developer station and a second developer station can be performed. While the first developer station may use optical readable toner, the second developer station may use a MICR toner. Such a printing station is described in WO-A-99/24877, the disclosure of which is hereby also incorporated by reference to the present disclosure.

The invention provides a comfortable printing system comprising in-line test equipment for character recognition both optical and magnetical as well as bar code scanning. With such a system document verification and document tracking in a printing production line can be performed to enhance print quality assurance. The embodiment as described comprises a magnetic head mounted to a printer in the region of a stacker. Of course, such magnetic read carrier may be utilized at any other position within a printing line, in which precise stop position of the paper may be utilized. Alternative embodiments may provide a magnetic read head in a buffer whereby the recording web may be stopped for reading while printing is continued. During the test steps, newly printed material would be fed into the buffer thereby increasing the amount of carrier within the buffer.

In still further embodiments, a magnetic read head may be fixed to a carrier and the paper being advanced across the read head. The magnetic attributes of the printed density marking blocks at the edge of the continuous form would then be detected while the form would be in motion. According to such embodiments, a magnetic read head assembly may be fixed in position in the stacker area of a printer or in a turn-bar mechanism of a printer.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for printing at least one of optical and magnetic information onto a continuous web-shaped recording carrier in a printing line, the carrier comprising at least one of an optical recording zone and a magnetic recording zone, comprising the steps of:

printing the optical information by a printing station onto the recording carrier using optical readable toner or printing the magnetic information being printed by a printing station onto the recording carrier using magnetic ink character recognition toner; and testing by using at least one of a magnetic test equipment for inspection and an optical image test equipment for inspection and wherein both the magnetic test equipment and the optical image test equipment are located in line with one another in the printing line and wherein at least one of the test equipments is used after a print stop of the printing station has been initiated.

2. The method according to claim 1, wherein at least one of the testings is performed during a print stop.

3. The method according to claim 1 wherein the testing step is controlled by a controller which initiates print stops of the printing station.

4. The method according to claim 1 wherein bar codes printed on the recording carrier are read by bar code equipment.

5. The method according to claim 4 wherein signals generated by at least one of the magnetic test equipment, the bar code read equipment, and the optical image test equipment are used for document tracking.

6. The method according to claim 1 wherein the recording carrier is transported to a predetermined position with respect to the test equipment before the inspection step is initiated.

7. The method according to claim 6 wherein the predetermined position with respect to the test equipment is a top-of-page position.

8. A printing line, comprising:

a printing device for printing at least one of optical and magnetic information onto a continuous web-shape recording carrier, the information being provided as a data stream from an electronic data source, the carrier comprising at least one of an optical recording zone and a magnetic recording zone;

an optical image test equipment for inspection located inline with the printing line and adapted to inspect print quality or to recognize printed contents of a document;

a magnetic test equipment for inspection located inline with the printing line and adapted to detect magnetic information printed on the recording carrier; and the test equipments are located at an output path of the printing device.

9. The printing line according to claim 8 further comprising a bar code reading equipment located inline with the printing line and adapted to read printed bar code information from the recording carrier.

10. The printing line according to claim 9 wherein the bar code reading equipment is a laser scanner device.

11. The printing line according to claim 8 wherein the optical test equipment comprises a CCD camera.

12. The printing line according to claim 8 wherein the magnetic test equipment comprises a magnetic ink character recognition reader.

13. The printing line according to claim 8 wherein the magnetic test equipment is electronically connected to an electronic printer control unit.

14. The printing line according to claim 8 wherein the optical test equipment comprises a character recognition device adapted to inspect the printed optical document and to recognize characters.

15. The printing line according to claim 8 wherein a character recognition device is connected to a document contents verification unit which is adapted to compare the information detected by the character recognition device with the information provided as a data stream from the electronic data source.

16. The printing line according to claim 8 further comprising a winding roll which receives the printed carrier from the output path of the printing device, whereby at least one of the test equipments is located between the printing device and the winding roll.

17. The printing line according to claim 8, further comprising a stacker which receives the printed carrier from the output path of the printing device, whereby at least one of the test equipments is arranged at the stacker.

18. The printing line according to claim 17 wherein the magnetic test equipment is mounted at the stacker of the printing device.

19. The printing line according to claim 8, wherein the magnetic test equipment comprises a head carrier which is movable transversely across the recording carrier by a motor and a drive pulley, a movement of the head carrier being provided by a carrier guide rail.

20. The printing line according to claim 8 wherein the optical test equipment comprises a strobe light.

21. The printing line according to claim 8 further comprising a buffer zone which is adapted to buffer the recording carrier.

22. The printing line according to claim 21 wherein at least one of the test equipments is located in the buffer zone adapted to buffer the recording carrier.

23. The printing line according to claim 8, further comprising a controller which controls a carrier transport unit to transport the recording carrier upon receipt of a test signal to a predetermined position with respect to at least one of the test equipments before the inspection step is initiated.

24. The printing line according to claim 23 wherein the predetermined position with respect to at least one of the test equipments is a top-of-page position.

25. The printing line according to claim 8 further comprising a controller which controls carrier transport unit to transport the recoding carrier upon receipt of a printer-stop-signal to a predetermined position with respect to at least one of the test equipments before the inspection step is initiated.

26. The printing line according to claim 25 wherein the predetermined position with respect to at least one of the test equipments is a top-of-page position.

27. A method for printing at least one of optical and magnetic information onto a continuous web-shaped recording carrier in a printing line, the carrier comprising at least one of an optical recording zone and a magnetic recording zone, comprising the steps of:

printing the optical information by a printing station onto the recording carrier using optical readable toner or printing the magnetic information being printed by a printing station onto the recording carrier using magnetic ink character recognition toner; and testing by using at least one of a magnetic test equipment for inspection and an optical image test equipment for inspection and wherein both the magnetic test equipment and the optical image test equipment are located in line with one another, in the printing line, and wherein the testing step is controlled by a controller which initiates print stops of the printing station.

28. The method according to claim 27 wherein at least one of the testings is performed during a print stop.

29. A printing line, comprising:

a printing device for printing at least one of optical and magnetic information onto a continuous web-shape recording carrier, the information being provided as a data stream from an electronic data source, the carrier comprising at least one of an optical recording zone and a magnetic recording zone;

an optical image test equipment for inspection located inline with the printing line and adapted to inspect print quality or to recognize printed contents of a document;

a magnetic test equipment for inspection located inline with the printing line and adapted to detect magnetic information printed on the recording carrier; and a character recognition device connected to a document contents verification unit which is adapted to compare the information detected by the character recognition device with the information provided as a data stream from the electronic data source.

30. A printing line, comprising:

a printing device for printing at least one of optical and magnetic information onto a continuous web-shape recording carrier, the information being provided as a data stream from an electronic data source, the carrier comprising at least one of an optical recording zone and a magnetic recording zone;

an optical image test equipment for inspection located inline with the printing line and adapted to inspect print quality or to recognize printed contents of a document;

a magnetic test equipment for inspection located inline with the printing line and adapted to detect magnetic information printed on the recording carrier; and the magnetic test equipment comprises a head carrier which is movable transversely across the recording carrier by a motor and a drive pulley, a movement of the head carrier being provided by a carrier guide rail.

31. A printing line, comprising:

a printing device for printing at least one of optical and magnetic information onto a continuous web-shape recording carrier, the information being provided as a data stream from an electronic data source, the carrier comprising at least one of an optical recording zone and a magnetic recording zone;

an optical image test equipment for inspection located inline with the printing line and adapted to inspect print quality or to recognize printed contents of a document;

a magnetic test equipment located inline with the printing line and adapted to detect magnetic information printed on the recording carrier;

a buffer zone which is adapted to buffer the recording carrier; and at least one of the test equipments is located in the buffer zone.

32. A printing line, comprising:

a printing device for printing at least one of optical and magnetic information onto a continuous web-shape recording carrier, the information being provided as a data stream from an electronic data source, the carrier comprising at least one of an optical recording zone and a magnetic recording zone;

an optical image test equipment for inspection located inline with the printing line and adapted to inspect print quality or to recognize printed contents of a document;

a magnetic test equipment for inspection located inline with the printing line and adapted to detect magnetic information printed on the recording carrier; and a controller which controls a carrier transport unit to transport the recording carrier upon receipt of a test signal to a predetermined position with respect to at least one of the test equipments before the testing step is initiated.

* * * * *

UNITED STATES PATENT AND TRADEMARK OFFICE
Certificate

Patent No. 6,137,967

Patented: October 24, 2000

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Thomas Laussermair, USA; Abhijit Bhattacharya, USA; Michael Schmitt, USA; Tony Ribeiro, USA; Frank Lorenz, USA; Leon T. Dietz, USA;

Signed and Sealed this Twenty-fourth Day of April, 2001.

ARTHUR T. GRIMLEY
*Supervisory Patent Examiner*
Art Unit 285